(12) United States Patent
Auer et al.

(10) Patent No.: US 12,678,980 B2
(45) Date of Patent: Jul. 14, 2026

(54) APPARATUS AND METHOD FOR GRIPPING AN OBJECT

(71) Applicant: Bayerische Motoren Werke Aktiengesellschaft, Munich (DE)

(72) Inventors: Christian Auer, Pilsting (DE); Claus-Peter Baumann, Leiblfing (DE); Alois Dobler, Holzheim (DE); Martin Endres, Pfaffenhofen an der Ilm (DE); Reinhold Hackl, Regenstauf (DE); Franz Korber, Mallersdorf (DE); Martin Kuhn, Regenstauf (DE); Mario Meinhardt, Munich (DE); Maximilian Rainer, Offenberg (DE); Markus Sieber, Bernhardswald (DE); Franz Stockner, Aholming (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 941 days.

(21) Appl. No.: 17/919,067

(22) PCT Filed: Mar. 23, 2021

(86) PCT No.: PCT/EP2021/057335
§ 371 (c)(1),
(2) Date: Oct. 14, 2022

(87) PCT Pub. No.: WO2021/209230
PCT Pub. Date: Oct. 21, 2021

(65) Prior Publication Data
US 2023/0158690 A1 May 25, 2023

(30) Foreign Application Priority Data

Apr. 15, 2020 (DE) .................... 10 2020 110 228.3

(51) Int. Cl.
*B25J 15/08* (2006.01)
*B25J 15/00* (2006.01)
(Continued)

(52) U.S. Cl.
CPC ......... *B25J 15/103* (2013.01); *B25J 15/0028* (2013.01); *B25J 15/0033* (2013.01); *B25J 15/0475* (2013.01); *B25J 15/08* (2013.01)

(58) Field of Classification Search
CPC .... B25J 15/10; B25J 15/0028; B25J 15/0061; B25J 15/0253; B25J 15/0475; B25J 15/08; B25J 15/0033; B65B 35/36
(Continued)

(56) References Cited

U.S. PATENT DOCUMENTS

| | | | | | |
|---|---|---|---|---|---|
| 3,424,488 | A | * | 1/1969 | Renfroe | ................... B66C 1/32 |
| | | | | | 294/67.32 |
| 4,479,673 | A | * | 10/1984 | Inaba | ...................... B25J 15/10 |
| | | | | | 269/118 |

(Continued)

FOREIGN PATENT DOCUMENTS

| | | |
|---|---|---|
| AT | 11 337 U1 | 8/2010 |
| CN | 2672015 Y | 1/2005 |

(Continued)

OTHER PUBLICATIONS

A Grabbing Mechanical Hand; Patent No. 104626132; Document ID: CN 104626132 A; Date Published: May 20, 2015; Inventor: Gao Bin, Zhu Jing-hua; Application No. CN 201510035819 A; Date Filed: Jan. 23, 2015 (Year: 2015).*

(Continued)

*Primary Examiner* — Mahdi H Nejad
(74) *Attorney, Agent, or Firm* — Crowell & Moring LLP

(57) ABSTRACT

An apparatus for gripping an object includes a base element and at least three gripping arms which are mounted on the
(Continued)

base element. The at least three gripping arms are each movable independently of one another relative to the base element and the object can be picked up by the at least three gripping arms. The at least three gripping arms each have a hook-shaped gripping tool.

11 Claims, 4 Drawing Sheets

(51) Int. Cl.
  *B25J 15/04* (2006.01)
  *B25J 15/10* (2006.01)
(58) Field of Classification Search
  USPC .................................. 901/39; 294/119.1, 207
  See application file for complete search history.

(56) References Cited

U.S. PATENT DOCUMENTS

| | | | | |
|---|---|---|---|---|
| 4,696,503 A * | 9/1987 | Collodel | .............. | B25J 15/0273 |
| | | | | 901/39 |
| 5,150,937 A * | 9/1992 | Yakou | .................... | B25J 15/103 |
| | | | | 294/907 |
| 9,757,849 B2 * | 9/2017 | Stepp | .................... | B25B 27/026 |
| 9,770,797 B2 * | 9/2017 | Yang | ....................... | B23Q 16/02 |
| 10,464,218 B2 * | 11/2019 | Golan | .................... | B25J 15/103 |
| 10,556,338 B1 | 2/2020 | Marchese et al. | | |
| 2001/0045755 A1 * | 11/2001 | Schick | ................. | B25J 15/0061 |
| | | | | 294/907 |
| 2010/0314895 A1 * | 12/2010 | Rizk | .................... | B25J 15/0475 |
| | | | | 29/525.01 |
| 2011/0037283 A1 | 2/2011 | Wegener et al. | | |
| 2012/0299322 A1 | 11/2012 | White | | |
| 2013/0128029 A1 * | 5/2013 | Leobal | ................. | B60C 25/125 |
| | | | | 348/128 |
| 2013/0139974 A1 * | 6/2013 | Gonzaga | .............. | B60C 25/138 |
| | | | | 29/401.1 |
| 2015/0123416 A1 * | 5/2015 | Kitamura | ................. | B25J 15/08 |
| | | | | 901/34 |
| 2019/0176346 A1 * | 6/2019 | Ma | .......................... | B25J 19/023 |
| 2024/0123634 A1 * | 4/2024 | Wang | ................... | B25J 15/0028 |

FOREIGN PATENT DOCUMENTS

| | | | |
|---|---|---|---|
| CN | 101992946 A | 3/2011 |
| CN | 104589366 A | 5/2015 |
| CN | 104626132 A | 5/2015 |
| CN | 206912785 U | 1/2018 |
| CN | 108127683 A | 6/2018 |
| CN | 207432232 U | 6/2018 |
| CN | 108972494 A | 12/2018 |
| DE | 256 231 A3 | 5/1988 |
| DE | 10 2018 007 932 A1 | 4/2019 |
| DE | 10 2017 219 757 A1 | 5/2019 |
| DE | 10 2018 106 812 A1 | 9/2019 |
| JP | 2005-144575 A | 6/2005 |
| JP | 2019-54778 A | 4/2019 |
| WO | WO 2019/091803 A1 | 5/2019 |

OTHER PUBLICATIONS

A Multi-angle Adjusting Flexible Clamp; Document ID: CN 108127683 B; Inventor: Zhang Fan, Shen Ke (Year: 2024).*
A New Flexible Finger; Document ID: CN 107378980 A; Date Published: Nov. 24, 2017; Inventor: Zhang Fan, Liu Lu (Year: 2017).*
Gripping Device and Robot Arm Comprising Such a Gripping Device; Document ID: WO 2019091803 A1; Inventor: Brudniok Sven, Riedel Martin; Date Published: May 16, 2019 (Year: 2019).*
English translation of Chinese-language Office Action issued in Chinese Application No. 202180015104.8 dated Feb. 28, 2025 (10 pages).
PCT/EP2021/057335, International Search Report dated Jul. 5, 2021 (Three (3) pages).
German Search Report issued in German application No. 10 2020 110 228.3 dated Feb. 15, 2021, with Statement of Relevancy (Six (6) pages).

* cited by examiner

APPARATUS AND METHOD FOR GRIPPING AN OBJECT

BACKGROUND AND SUMMARY OF THE INVENTION

The invention relates to an apparatus and a method for gripping an object.

A production system for producing motor vehicles is already known from DE 10 2018 007 932 A1. A handling robot having at least one movable gripper is thereby provided. The gripper can be adapted to take a gripping tool specific to a particular motor vehicle component from a magazine. The handling robot can thereby be retooled automatically in dependence on the motor vehicle component to be gripped.

The object of the present invention is to provide an apparatus and a method for gripping an object, by means of which the object can be gripped particularly securely.

A first aspect of the invention relates to an apparatus for gripping an object, having a base element and having at least two gripping arms which are mounted on the base element and by means of which the object can be picked up. The object is in particular a motor vehicle component. Alternatively, the object can be a domestic appliance, also referred to as so-called white goods, or another object. In order to pick up the object, the gripping arms are configured to be movable relative to the base element. Owing to the movable configuration of the gripping arms, the gripping arms can be applied to the object, whereby the object can be picked up. In order to allow the object to be picked up particularly securely, there are at least three gripping arms which are each movable independently of one other relative to the base element. The independent movability of the gripping arms relative to the base element allows the gripping arms to be adapted particularly advantageously in terms of their position relative to one another to an outer contour of the object to be gripped. The object to be picked up can thereby be gripped particularly securely by means of the flexible apparatus.

In order to allow the object to be held particularly securely by means of the apparatus, it is provided according to the invention that the gripping arms each comprise a hook-shaped gripping tool. This means that the gripping arms each have a hook-shaped gripping tool which can be hooked onto the object. By hooking the gripping tools into the object, the object can be picked up particularly securely by means of the gripping arms. The gripping tools have in particular a bent hook shape. A hollow of the hook-shaped gripping tools can be hooked onto a surface of the object to be picked up, whereby a form-fitting connection between the gripping tool and the object can be provided. The form-fitting connection permits particularly great force transmission between the object and the gripping tool, whereby the object can be held particularly securely by means of the gripping tools.

It has been found to be particularly advantageous if the hook-shaped gripping tools are each mounted via a connection end on an adjustment device of the respective gripping arm so as to be rotatable about a tool rotation axis. The gripping tools are each rotatable through 360 degrees about their tool rotation axis. In particular, all the tool rotation axes of all the gripping tools of the apparatus are oriented parallel to one another. The rotatability of the gripping tools about the tool rotation axis allows the gripping tools to be oriented relative to the object to be picked up or relative to a surface, associated with the gripping tools, of the object to which the gripping tool is to be applied. By rotating the gripping tools about their tool rotation axis, an orientation of a hollow can be adjusted. On rotation of the gripping tool about the tool rotation axis, an open side of the hollow is rotated about the tool rotation axis and thus, in every different position of the gripping tool about the tool rotation axis, is oriented in a different direction perpendicular to the tool rotation axis. The rotatability of the gripping tools about the tool rotation axis allows the orientation of the gripping tool to be adapted particularly precisely to the associated surface of the object to be gripped, whereby the object can be gripped particularly securely by means of the gripping tools.

It has further been found to be advantageous if the hook-shaped gripping tools each have at least one cutting edge which can be hooked into the object in order to pick up the object. In other words, in order to pick up the object, the cutting edge is brought into contact with the associated surface of the object, whereby the cutting edge hooks onto the surface of the object. Hooking of the cutting edge onto the object forms a form-fitting connection of the gripping tool with the surface of the object, via which the object can be picked up by means of the gripping tool. The cutting edge of the gripping tool has in particular an acute angle, whereby the cutting edge can be hooked particularly easily and securely onto the surface of the object to be picked up. In particular, the cutting edge can in some regions cut into the surface of the object to be picked up, whereby the cutting edge hooks onto the surface of the object. The cutting edge allows a form-fitting connection between the gripping tool and the surface of the object to be established in a particularly low-force manner.

It has been found to be particularly advantageous in this context if the cutting edge is arranged in the hollow of the gripping tool. This means that, in order to pick up the object, the cutting edge arranged in the hollow of the gripping tool is applied to the edge, associated with the cutting edge, of the object and is hooked onto the surface of the object. The gripping tool can thereby enclose at least in some regions the surface of the object to be picked up. The arrangement of the cutting edge in the hollow of the hook-shaped gripping tool allows the object to be centered relative to the gripping tool particularly easily when picking up the object by means of the gripping tools.

In a further embodiment of the invention, it has been shown to be advantageous if the hook-shaped gripping tools can be oriented with their cutting edge at an angle of in each case from 25 degrees to 95 degrees, in particular at an angle of from 30 degrees to 90 degrees, relative to a plane spanned by the surface of the object that is associated with the gripping tool, wherein the gripping tools are to be applied to the associated surface in order to pick up the object. This means that a surface of the gripping tool that provides the cutting edge encloses an angle of between 25 degrees and 95 degrees, in particular between 30 degrees and 90 degrees, with the plane spanned by the associated surface of the object. Particularly secure and firm hooking of the cutting edge of the associated gripping element onto the surface of the object can thereby be ensured, whereby the object can be picked up particularly securely by means of the apparatus.

It has been found to be particularly advantageous if the gripping arms are pivotable relative to the base element about respective associated rotation axes. In particular, each of the gripping arms thereby has its own associated rotation axis about which the respective gripping arm is pivotable relative to the base element. The pivotability of the gripping arms about the respective associated rotation axes can be made possible via respective rotation devices. For this purpose, each of the gripping arms can be mounted on the base element via a rotation device which defines the respective rotation axis. The rotatability of the gripping arms relative to the base element about the rotation axes allows the gripping arms to be adjusted in a particularly extensive and different way, whereby the object to be picked up can be gripped particularly easily at its outer contour and is to be held particularly securely.

It has been found to be particularly advantageous in this context if the rotation axes are oriented parallel to one another. This means that the gripping arms are pivotable about the respective rotation axes in movement planes which extend parallel to one another, in particular in the same movement plane. A distance between the gripping arms, in particular between their respective ends remote from the base element, can thereby be adjusted particularly advantageously, whereby a particularly high degree of movability of the apparatus can be achieved.

In a further embodiment of the invention, it has been shown to be advantageous if at least one of the gripping arms comprises a translatory adjustment device as the adjustment device and a gripping element which is mounted on the translatory adjustment device and is movable relative to the translatory adjustment device and by means of which the gripping tool can be held. In particular, the translatory adjustment device is in the form of a rail. The translatory adjustment device extends with its longitudinal direction of extent at least substantially perpendicular to the respective associated rotation axis of the gripping arm and is adapted to move, in particular to displace, the gripping element in translation in the longitudinal direction of extent relative to the rotation axis. The gripping element is mounted at least indirectly on the translatory adjustment device and is adapted to hold the gripping tool by means of which the object can be picked up. The translatory adjustment device in turn permits a movement of the gripping element relative to the base element, whereby a distance between the gripping element and the base element is adjustable. Thus, at least one of the gripping arms is in at least two-part, in particular multi-part, form, wherein the individual parts of the gripping arm are movable relative to one another. Particularly advantageous movability of the apparatus can thereby be achieved, which in turn allows the object to be picked up and held particularly securely.

It has hereby been found to be particularly advantageous if the gripping element is movable in the direction of longitudinal extent of the translatory adjustment device. The gripping element can thereby be adjusted in terms of its distance relative to the rotation axis associated with the gripping arm. Via the movement of the gripping element in the direction of longitudinal extent of the translatory adjustment device, the gripping element is displaceable in particular in the movement plane in which the gripping arms are pivotable about the respective rotation axes. The gripping element can thereby be adjusted in terms of its position relative to the other gripping arms. In particular, each of the gripping arms comprises the translatory adjustment device and the gripping element mounted on the translatory adjustment device, wherein the gripping elements are adjustable relative to one another in terms of their position relative to one another by movement along the translatory adjustment device and pivoting of the translatory adjustment device about the respective associated rotation axis. Particularly great freedom of movement of the gripping elements relative to one another can thereby be provided, which results in the object being gripped particularly securely.

Alternatively or additionally, the gripping element is adjustable in terms of its distance relative to the translatory adjustment device. It is thereby provided in particular that the gripping element is adjustable relative to the translatory adjustment device in a direction of longitudinal extent of the associated rotation axis. The gripping element can thereby be adjusted relative to the translatory adjustment device parallel to the associated rotation axis of the gripping arm in the direction of longitudinal extent of the rotation axis. Particularly flexible movability of the gripping elements relative to one another and in particular three-dimensionally in space is thereby made possible. A respective contact point at which the respective gripping element comes into contact with the object when it grips the object is thus controllable particularly precisely and easily by means of the gripping element.

In a further embodiment of the invention, it is provided that the gripping element comprises a quick-change device by means of which the gripping tool can be held via a quick-release fastener. The gripping tool can be adapted to the object to be gripped. The quick-change device allows the gripping tool to be held, or the gripping tool to be changed, particularly easily and quickly, so that the apparatus can be adapted particularly easily and quickly to the object to be picked up and gripped. Via the gripping tools which can be held, which are adapted to the object to be gripped, the object can be held particularly securely.

In a further embodiment of the invention, it has been shown to be advantageous if there is provided a detection device by means of which the object to be gripped can be detected and a sensor signal characterizing the detected object can be provided to an electronic computing device. There is thereby further provided the electronic computing device by means of which, in dependence on the received sensor signal, a relative position of the object to be gripped relative to the gripping arms can be determined. There is further provided an electronic control device by means of which, in dependence on the determined relative position, the gripping arms can be moved relative to the object and the gripping tools can be applied to the object. The apparatus can thus particularly advantageously be moved towards the object to be gripped and a respective position or orientation of the gripping arms relative to the object can be adjusted in order to be able to pick up the object particularly securely and quickly by means of the gripping tools. This detection device, in particular electronic detection device, comprises, for example, a camera device by means of which an image of the object can be recorded, wherein the image is characterized by the sensor signal. On the basis of the image, the relative position of the apparatus, or of the gripping arms, relative to the object to be gripped can be determined via the electronic computing device by means of an electronic data-set evaluation device, in particular an image evaluation device. By means of the control device, a movement of the gripping arms, or of the gripping elements, of the apparatus relative to the object can be controlled or corrected in dependence on the determined relative position, whereby particularly precise application of the gripping tools to the object is made possible.

In a further embodiment of the invention there is provided a fastening device by means of which the apparatus can be fastened to a robot. Via the fastening device, the apparatus can be held by the robot, whereby the apparatus is movable relative to the object by means of the robot. By means of the robot, the apparatus is movable particularly flexibly relative to the object in order to ensure that the object is picked up optimally by means of the apparatus. This means that, by means of the robot, the apparatus can be moved towards the object, wherein, by means of the control device, the gripping arms of the apparatus are movable relative to the object in order to pick up the object. The robot thus permits a particularly flexible arrangement of the apparatus relative to the object in order on the one hand to make it possible for the object to be picked up by means of the apparatus in the first place and on the other hand to ensure particularly advantageous gripping of the object by means of the apparatus.

A second aspect of the invention relates to a method for gripping an object, in which at least two gripping arms mounted on the base element are moved relative to the base element in order to pick up the object. For particularly advantageous gripping of the object, it is provided that at least three gripping arms are each moved independently of one another relative to the base element. The method is adapted to be carried out by an apparatus as has already been described in connection with the apparatus according to the invention. In order to be able to pick up the object particularly securely, hook-shaped gripping tools of the gripping arms are applied to a surface of the object. The object is picked up by means of the gripping tools. The gripping tools thereby hook into the surface of the object. Via the hook-shaped gripping tools, the object can be held particularly securely on the apparatus and transported by the apparatus.

It has been shown to be particularly advantageous in this context if a cutting edge of the hook-shaped gripping tools is oriented at an angle of from 25 degrees to 95 degrees, in particular at an angle of from 30 degrees to 90 degrees, relative to a plane spanned by a surface of the object, to which surface the gripping tools are applied in order to pick up the object. This means that the cutting edge encloses an angle of from 25 degrees to 95 degrees, in particular an angle of from 30 degrees to 90 degrees, with the plane spanned by the surface of the object. Via this angle, the gripping tool can be hooked particularly securely on the object. Via the cutting edge, the hook-shaped gripping tool makes a micro-cut in the surface of the object, via which the object can be hooked particularly firmly with the gripping tool. Via this hooking, the object can be held particularly securely on the gripping tool.

Advantages and advantageous further developments of the apparatus according to the invention are to be regarded as advantages and advantageous further developments of the method according to the invention and vice versa. For this reason, the further advantages and advantageous further developments of the method according to the invention are not described again here.

Further features of the invention will become apparent from the claims, the figures and the description of the figures. The features and feature combinations mentioned hereinabove in the description and the features and feature combinations mentioned hereinbelow in the description of the figures and/or shown solely in the figures can be used not only in the indicated combination but also in different combinations or on their own.

The invention will now be explained in greater detail by means of a preferred exemplary embodiment and with reference to the drawings.

DETAILED DESCRIPTION OF THE DRAWINGS

Figure 1:
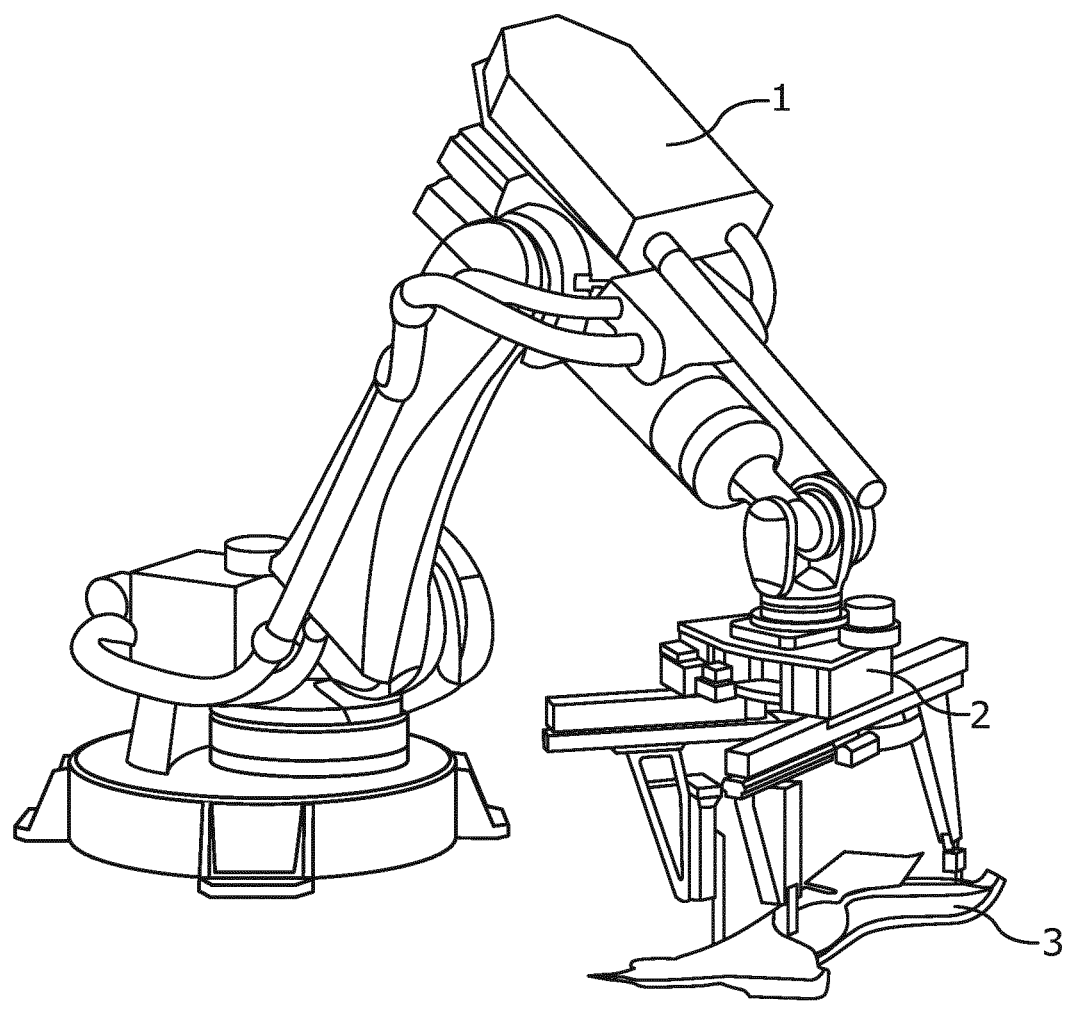
FIG. 1 is a perspective view of a robot having an apparatus for gripping a motor vehicle component, by means of which the motor vehicle component is picked up and which can be adapted to the motor vehicle component.

Identical elements are provided with identical reference numerals in the figures.

FIG. 1 shows a robot 1 by means of which an apparatus 2 for gripping an object is held. In the following text, the apparatus 2 will be described in connection with the picking up of a motor vehicle component 3 as the object. By means of the robot 1, the apparatus 2 is movable relative to the motor vehicle component 3 in order to allow the apparatus 2 to be applied to the motor vehicle component 3. The robot 1 can be used, for example, in a production system for motor vehicles, in particular motor cars, wherein the motor vehicle component 3 is gripped by means of the apparatus 2, the apparatus 2 is moved by means of the robot 1, and then the motor vehicle component 3 is released by the apparatus 2, whereby the motor vehicle component 3 can be transported from a first location to a second location.

Figure 2:
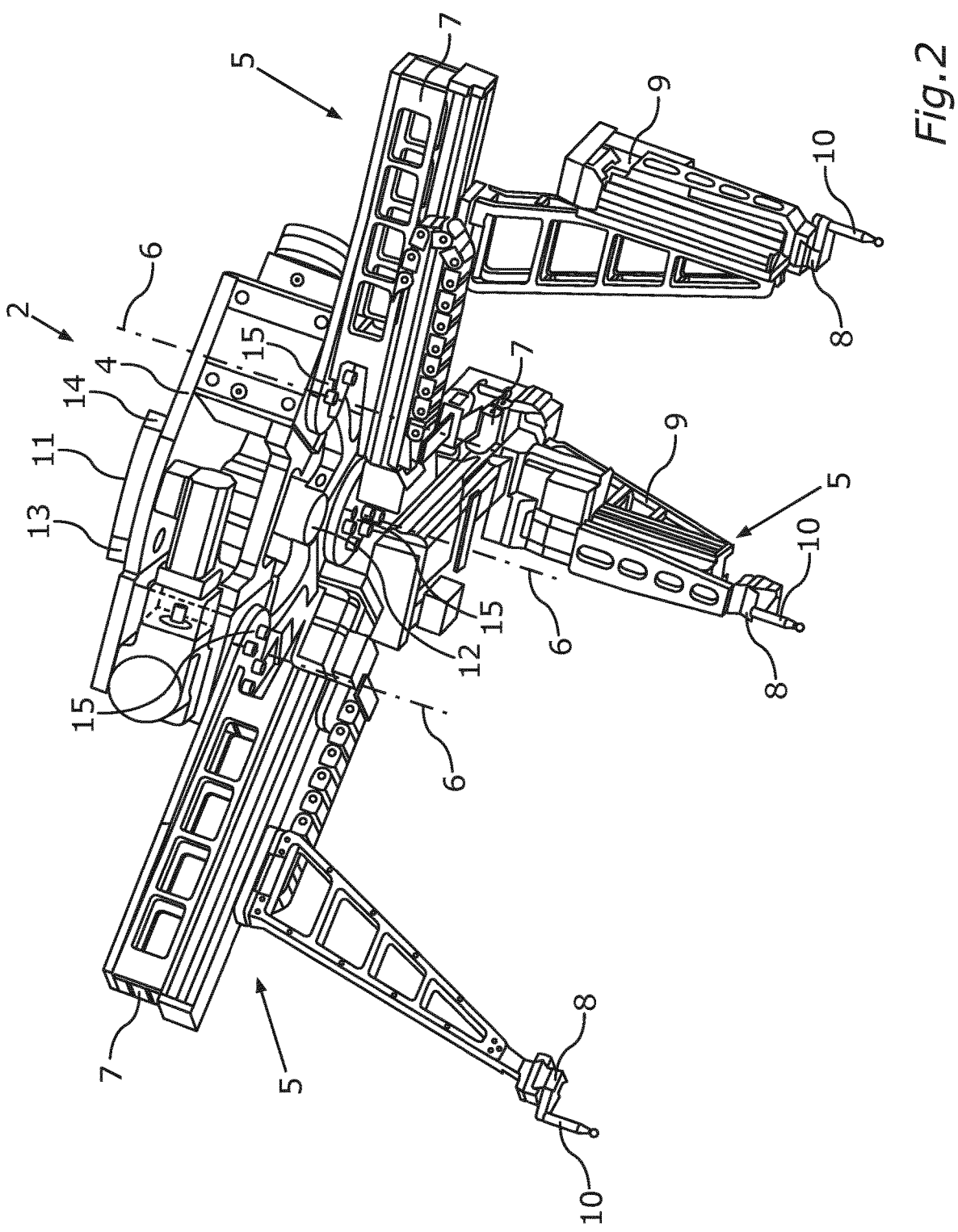
FIG. 2 is a perspective view of the apparatus for gripping the motor vehicle component having three gripping arms which are flexibly movable relative to one another and by means of which a gripping tool can be held via a respective quick-release fastener of a quick-change device, by means of which gripping tool the motor vehicle component can be gripped particularly securely.

The apparatus 2 is shown in greater detail in FIG. 2. It can be seen therein that the apparatus 2 comprises a base element 4 and three gripping arms 5 mounted on the base element 4. The gripping arms 5 are mounted on the base element 4 so as to be movable relative to the base element 4. In the present case, the gripping arms 5 are pivotable independently of one another relative to the base element 4 in a common movement plane about respective rotation axes 6 which are oriented parallel to one another. The apparatus 2 comprises rotation devices 15 which are associated with the gripping arms 5 and via which the gripping arms 5 are pivotable relative to the base element 4 about the rotation axes 6. In the present case, the rotation devices 15 are rotary tables. The three gripping arms 5 can thereby be set at an optimal angle relative to one another. In the present case, each of the gripping arms 5 has its own associated rotation axis 6. In an alternative embodiment (not shown), the rotation axes 6 can coincide.

In the present case, each of the gripping arms 5 comprises a translatory adjustment device, which in the present case is a rail 7, and a gripping element 8 mounted on the rail 7. In the present case, the rails 7 extend perpendicular to the rotation axes 6. The rails 7 provide traversing axes for the gripping elements 8. This means that the gripping elements 8 are movable relative to the rails 7 in a direction of longitudinal extent of the rails 7. In the present case, two of the three gripping arms 5 comprise a vertical adjustment device 9 by means of which a distance between the gripping elements 8 and the associated rails 7 of the gripping arms 5 is adjustable. In the present case, an adjustment direction of the vertical adjustment device 9 extends parallel to the associated rotation axes 6 of the gripping arms 5. Via the vertical adjustment devices 9, the gripping elements 8 can be moved closer to the rail 7 or away from the associated rail 7.

In order to be able to adapt the apparatus 2 particularly advantageously to the motor vehicle component 3 to be picked up, the gripping elements 8 each comprise a quick-change device 10. The quick-change device 10 is adapted to hold a gripping tool 16, which is adapted to the motor vehicle component 3 to be picked up, via a quick-release fastening. By holding the gripping tool 16 that is adapted to the motor vehicle component 3 to be gripped, the apparatus 2 can be adapted particularly quickly and easily to the motor vehicle component 3 by choosing the gripping tools 16 associated with the motor vehicle component 3. The gripping tools 16 will be explained in greater detail hereinbelow in connection with FIG. 3.

In order that the apparatus 2 can be held by means of the robot 1, the apparatus 2 comprises a fastening device 11, which in the present case is indicated diagrammatically by a box. Via the fastening device 11, the apparatus 2 can be fastened to the robot 1 and mounted on the robot 1. The fastening device 11 thus allows the apparatus 2 to be fastened particularly securely and easily to the robot 1, so that, by means of the robot 1, the apparatus 2 is movable relative to the motor vehicle component 3 to be gripped. For automated tool change at the robot 1, the fastening device 11 can be in the form of an automatic docking system.

In order to allow the motor vehicle component 3 to be gripped particularly precisely by means of the apparatus 2, the apparatus 2 in the present case comprises a detection device 12. In the present case, this detection device 12 comprises a camera device. The detection device 12 allows the apparatus 2 to be positioned relative to the motor vehicle component 3 by means of camera object detection. An image of the motor vehicle component 3 can be recorded by means of the camera device. The detection device 12 provides a sensor signal characterizing the image to an electronic computing device 13 of the apparatus 2. The received sensor signal can be evaluated by means of the electronic computing device 13. As a result of the evaluation of the sensor signal, a relative position of the apparatus 2, in particular of the gripping arms 5, relative to the motor vehicle component 3 can be determined. The electronic computing device 13 provides the determined relative position to an electronic control device 14 of the apparatus 2. By means of the control device 14, which like the electronic computing device 13 is indicated diagrammatically by a box, the gripping arms 5 are movable relative to the base element 4 in order to apply the gripping tools 16 to the motor vehicle component 3. As a result of receiving the relative position of the apparatus 2, or of the gripping arms 5, relative to the motor vehicle component 3 to be gripped, the gripping arms 5 are moved relative to the motor vehicle component 3 by means of the electronic control device 14 in dependence on the determined relative position in order to be able to pick up the motor vehicle component 3 particularly precisely. During a movement of the gripping arms 5 relative to the base element 4, or relative to the motor vehicle component 3, the motor vehicle component 3 can thereby repeatedly be recorded at regular intervals by means of the detection device 12. This makes it possible for the electronic computing device 13 to determine a relative position of the apparatus 2, or of the gripping arms 5, relative to the motor vehicle component 3 that is associated with the recordings of the motor vehicle component 3. In dependence on the plurality of determined relative positions, which have been determined at time intervals relative to one another, the movement of the gripping arms 5 relative to the motor vehicle component 3 can be adapted and thus corrected by means of the electronic control device 14. The motor vehicle component 3 can thereby be picked up particularly precisely by means of the apparatus 2. Alternatively or additionally, the relative position of the apparatus 2, or of the gripping arms 5, relative to the motor vehicle component 3 determined by means of the electronic computing device 13 can be provided to a further electronic control device, wherein the robot 1 is controllable by means of the further electronic control device in order to orient the apparatus 2 relative to the motor vehicle component 3 in dependence on the determined relative position.

Figure 3:
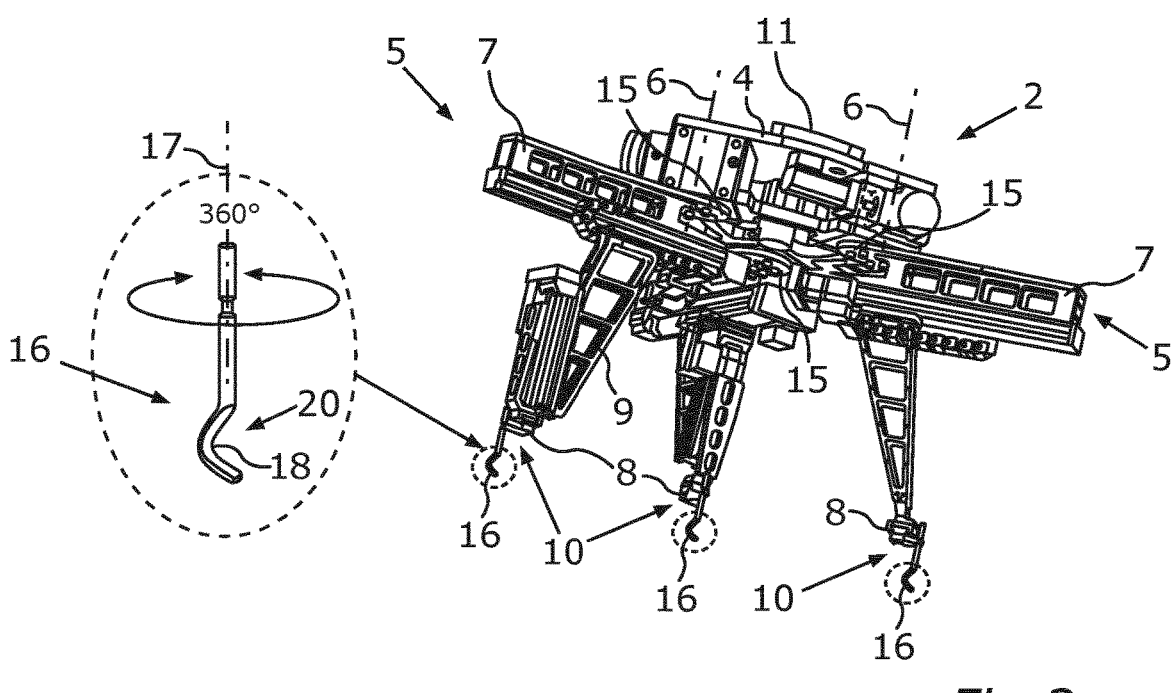
FIG. 3 is a perspective view of the apparatus having one hook-shaped gripping tool held on each gripping arm, wherein the gripping tools have a cutting edge via which the gripping tools can be applied to the motor vehicle component.

FIG. 3 shows the apparatus 2, wherein a gripping tool 16 is held via each of the gripping elements 8. In the present case, the gripping tools 16 are hook-shaped and thus form cutting hooks. The cutting hooks each have a free end and an end that is connected to the respective gripping elements 8. Via the respective end, the gripping tools 16 are rotatable relative to the gripping elements 8 about tool rotation axes 17. Each gripping tool 16 has an associated tool rotation axis 17. The tool rotation axes 17 of all the gripping tools 16 are oriented parallel to one another. In the present case, the tool rotation axes 17 extend parallel to the rotation axes 6 of the gripping arms 5. In the present case, the tool rotation axes 17 extend through a center axis of the ends of the gripping tools 16 that are connected to the gripping elements 8. The rotatability of the gripping tools 16 about the associated rotation axes 17 allows the gripping tools 16 to be oriented in dependence on an outer contour of a surface, associated with the gripping tools 16, of the motor vehicle component 3. The gripping tools 16 are to be applied to the associated surface of the motor vehicle component 3 in order to pick up the motor vehicle component 3.

As can be seen in an enlarged view of the gripping tool 16 in FIG. 3, each gripping tool 16 has a hollow 20, which is provided by a curve of the gripping tool 16. Within the hollow 20, the gripping tools 16 have a cutting edge 18 which can be brought into contact with the surface of the motor vehicle component 3 in order to pick up the motor vehicle component 3. This means that the cutting edge 18 is applied to the surface of the motor vehicle component 3 in order to pick up the motor vehicle component 3 by means of the apparatus 2. In order that the motor vehicle component 3 is picked up particularly securely by means of the gripping tools 16, the gripping tools 16 are hooked with the cutting edges 18 on the surface of the motor vehicle component 3. In order to ensure that the cutting edges 18 of the gripping tools 16 are hooked particularly securely onto the associated surface of the motor vehicle component 3, the cutting edges 18 are to be set at an angle of from 30 degrees to 90 degrees relative to a plane spanned by a surface of the gripping tool 16 relative to the surface of the motor vehicle component 3. This means that a first plane spanned by a surface of the gripping tool 16 encloses an angle which has a value of from 30 degrees to 90 degrees with the second plane spanned by the associated surface of the vehicle component 3, wherein the surface of the gripping tool 16 spanning the first plane provides and defines the cutting edge 18.

Figure 4:
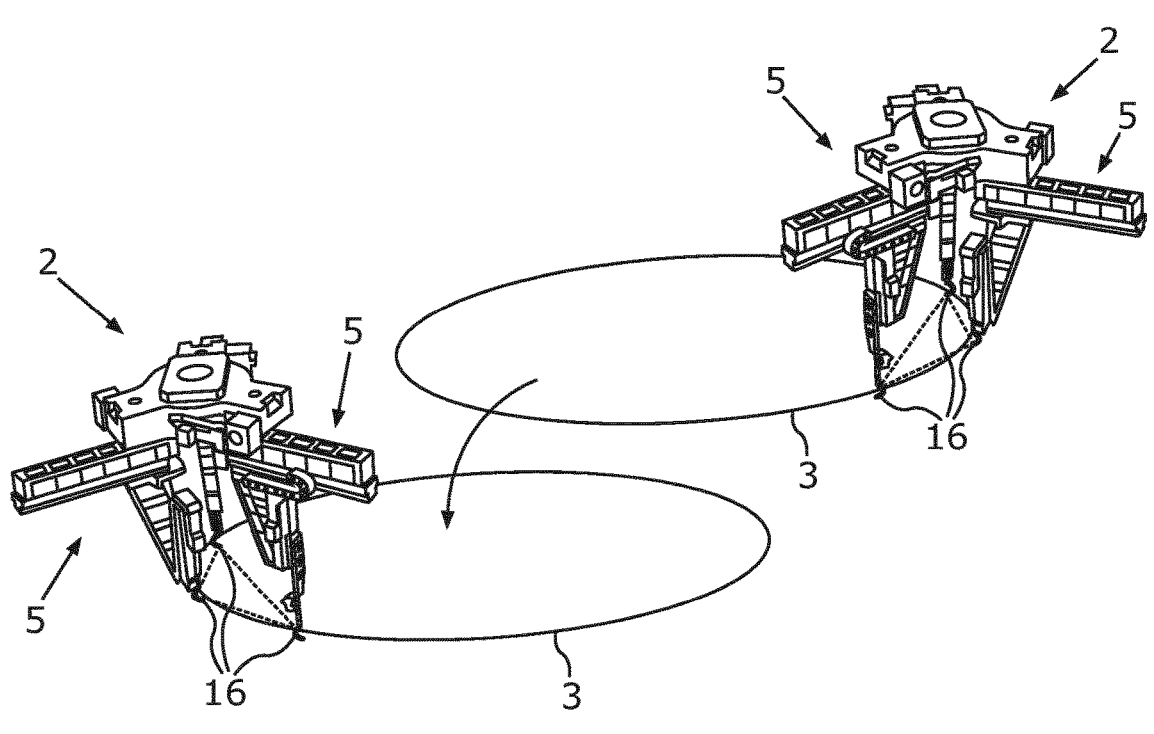
FIG. 4 is a perspective view of two apparatuses by means of each of which a motor vehicle component is picked up and by means of which the motor vehicle components can be oriented relative to one another.
Figure 5:
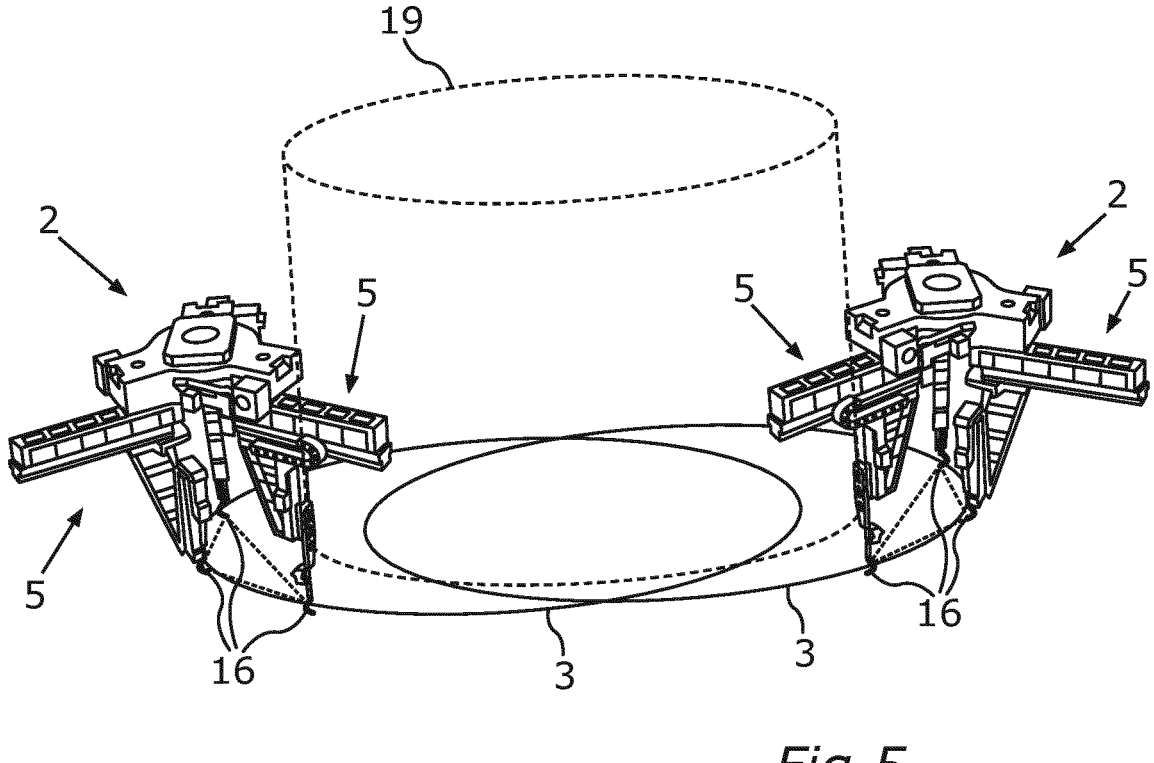
FIG. 5 is a perspective view of the apparatuses according to FIG. 4 by means of which the motor vehicle components are placed together, wherein the apparatuses free a particularly large process space via which the motor vehicle components can be processed.

FIG. 4 shows a process of joining two motor vehicle parts 3, wherein each of the motor vehicle parts 3 is picked up by means of a separate apparatus 2—as has already been described in connection with FIGS. 1 to 3. One of the motor vehicle components 3 is picked up by means of each apparatus 2. The apparatuses 2 are each movable relative to one another by means of a robot 1, whereby the motor vehicle components 3 picked up by the apparatuses 2 can be oriented relative to one another. In the present case, the motor vehicle components 3 are placed together by means of the apparatuses 2. FIG. 5 shows the motor vehicle parts 3 in their state placed together by means of the apparatuses 2. It can be seen in that figure that a particularly small space around the motor vehicle components 3 is covered by the apparatuses 2 holding the motor vehicle components 3. In the case of the arrangement of the motor vehicle components 3 in which they are placed together, there is thus a particularly large free process and working space 19 in which a tool can be moved in order to process at least one of the motor vehicle components 3, in particular to join the motor vehicle components 3 together.

The described hook-shaped gripping tools 16 allow the motor vehicle component 3 to be held particularly securely by means of the apparatus 2, whereby, with a particularly small triangle of forces spanned between the gripping tools 16 of the apparatus 2, the motor vehicle component 3 can be held particularly securely, which results in a particularly large process and working space. By means of the gripping tools 16, the motor vehicle component 3 is thus to be held particularly securely via the triangle of forces spanned by the gripping tools 16, whereby the particularly large process and working space at the motor vehicle part 3 can be kept free for processing of the motor vehicle part 3.

The described apparatus 2 and the described method for gripping the motor vehicle component 3 by means of the apparatus 2 are based on the finding that, owing to a high degree of automation in vehicle body construction, a large number of gripping systems are used for gripping motor vehicle components 3. Many of these gripping systems have only comparatively low flexibility. The apparatus 2 makes it possible for a wide range of motor vehicle components 3, including assemblies, in vehicle construction to be gripped particularly advantageously. A three-dimensional movement of the gripping arms 5 relative to the motor vehicle component 3 to be gripped is thereby possible. This allows the motor vehicle component 3 to be gripped by means of the apparatus 2 independently of its features or in dependence on its features. In many flexible grippers of the prior art, components are picked up by movable, form-fitting engagement.

The hook-shaped gripping tools 16 allow the motor vehicle component 3 to be picked up by a principle of forming cooperating triangles of forces. A particularly large amount of process space and working space can thereby be obtained. Furthermore, small components and very small components can be picked up by means of the hook-shaped gripping tools 16, in particular from a box.

At present, objects such as sheet-metal components are fixed, picked up and transported by a double cone or a double sphere via pick-up holes and trimming clamps in a large-area triangle formation or line formation. In order to make this possible in the prior art, pick-up holes or apertures have to be provided in the sheet-metal parts and uniform triangles of forces have to be formed, the orientation of which is as large as possible so as not to drop the object.

In the described apparatus, in contrast to the prior art, the hook-shaped gripping tools 16, which are cutting hooks, are provided on each of the gripping arms 5, which are each rotatable relative to the gripping elements 8 through 360 degrees about the second rotation axis 17. For picking up the object, the gripping tools 16 with their cutting edges 18 are oriented so that they enclose a cutting angle of from 30 degrees to 90 degrees with a plane spanned by a surface of the object, and clasp or clamp the object. A cut, in particular a micro-cut, is thereby formed in the object. There is no damage to the object.

When a double cone or a double sphere is used, uniform triangles of forces with as large an orientation as possible have to be chosen, whereby a process and working space is covered by the triangle of forces. When the hook-shaped gripping tools 16 are used, the object can be picked up with the formation of particularly small triangles of forces, whereby a particularly large process and working space 19 is freed at the object by the apparatus.

Overall, the invention shows how a flexible gripping system, which has gripping arms 5 which are actuatable particularly flexibly, and a scalable component clamp as the gripping tool 16 can be provided in the apparatus in order to gain process space.

LIST OF REFERENCE CHARACTERS

1 robot
2 apparatus
3 motor vehicle component
4 base element
5 gripping arm
6 rotation axis
7 rail
8 gripping element
9 vertical adjustment device
10 quick-change device
11 fastening device
12 detection device
13 electronic computing device
14 electronic control device
15 rotation device
16 gripping tool
17 tool rotation axis
18 cutting edge
19 process and working space
20 hollow

The invention claimed is:

1. An apparatus for gripping an object, comprising:
a base element; and
at least three gripping arms which are mounted on the base element, wherein the at least three gripping arms are each movable independently of one another relative to the base element and wherein the object can be picked up by the at least three gripping arms;
wherein the at least three gripping arms each have a hook-shaped gripping tool and wherein the hook-shaped gripping tool is a cutting hook;
wherein the cutting hook has at least one cutting edge, wherein the at least one cutting edge is disposed in a curve of the cutting hook, wherein the at least one cutting edge is set at an angle of from 30 degrees to 90 degrees relative to a plane spanned by a surface of the cutting hook relative to a surface of the object such that a first plane spanned by the surface of the cutting hook encloses an angle which has a value of from 30 degrees to 90 degrees with a second plane spanned by the surface of the object wherein the surface of the cutting hook spanning the first plane provides and defines the at least one cutting edge, and wherein the at least one cutting edge cuts into the surface of the object such that the at least one cutting edge hooks onto the surface of the object and such that a form-fitting connection of the gripping tool with the surface of the object is formed.

2. The apparatus according to claim 1, wherein the hook-shaped gripping tool is mounted via a connection end on an adjustment device of the respective gripping arm so as to be rotatable about a tool rotation axis.

3. The apparatus according to claim 2, wherein at least one of the at least three gripping arms has a translatory adjustment device as the adjustment device and has a gripping element which is mounted on the translatory adjustment device and which is movable relative to the translatory adjustment device and wherein via the gripping element the hook-shaped gripping tool is held.

4. The apparatus according to claim 3, wherein the gripping element is movable in a direction of a longitudinal extent of the translatory adjustment device.

5. The apparatus according to claim 3, wherein the gripping element is adjustable in terms of a distance of the gripping element relative to the translatory adjustment device.

6. The apparatus according to claim 3, wherein the gripping element has a quick-change device and wherein via the quick-change device the hook-shaped gripping tool is held via a quick-release fastener.

7. The apparatus according to claim 1, wherein the at least three gripping arms are pivotable relative to the base element about respective associated rotation axes.

8. The apparatus according to claim 7, wherein the respective associated rotation axes are disposed parallel to one another.

9. The apparatus according to claim 1, further comprising:
a detection device, wherein the object is detectably by the detection device;
an electronic computing device, wherein a sensor signal characterizing the object is receivable by the electronic computing device from detection device and wherein a relative position of the object relative to the at least three gripping arms is determinable by the electronic computing device in dependence on a received sensor signal; and
a control device, wherein, in dependence on a determined relative position of the object by the electronic computing device, the at least three gripping arms are movable relative to the object and the respective hook-shaped gripping tools are applyable to the object by the control device.

10. The apparatus according to claim 1, further comprising a fastening device, wherein the apparatus is fastenable to a robot by the fastening device.

11. A method for gripping an object by the apparatus according to claim 1, comprising the steps of:
moving the at least three gripping arms independently of one another relative to the base element; and
applying the respective hook-shaped gripping tools of the at least three gripping arms to the surface of the object.

* * * * *